Patented Dec. 9, 1930

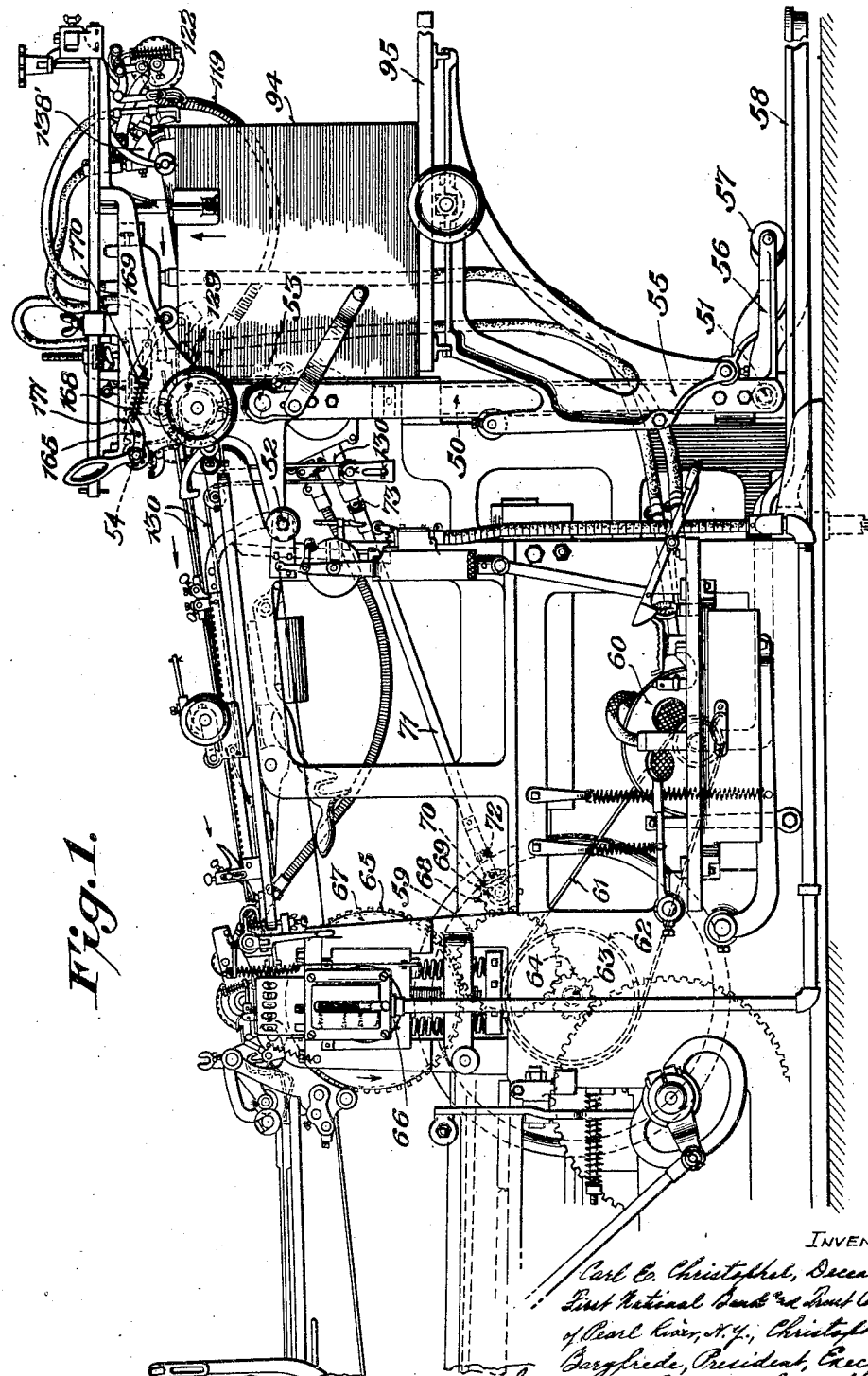

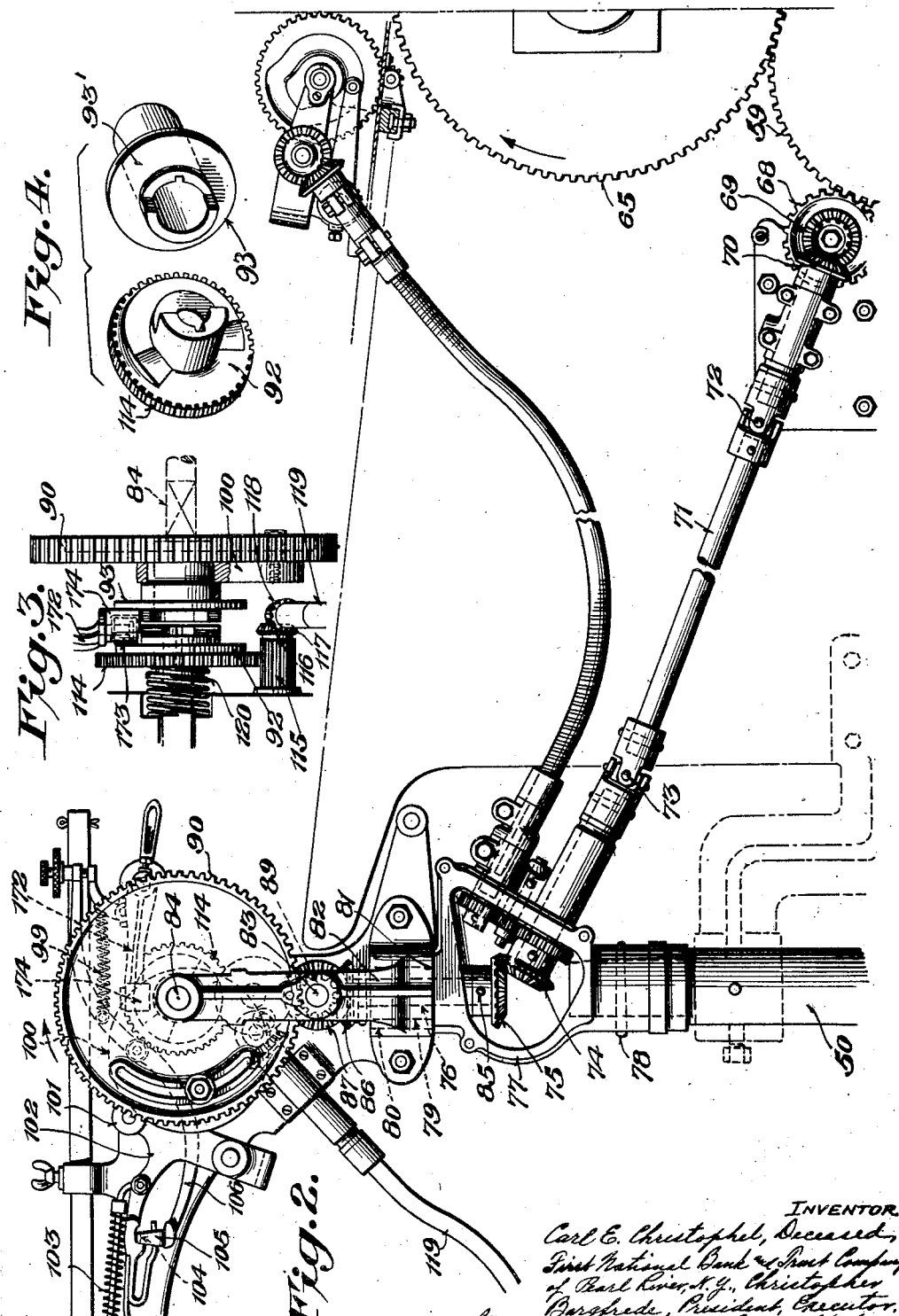

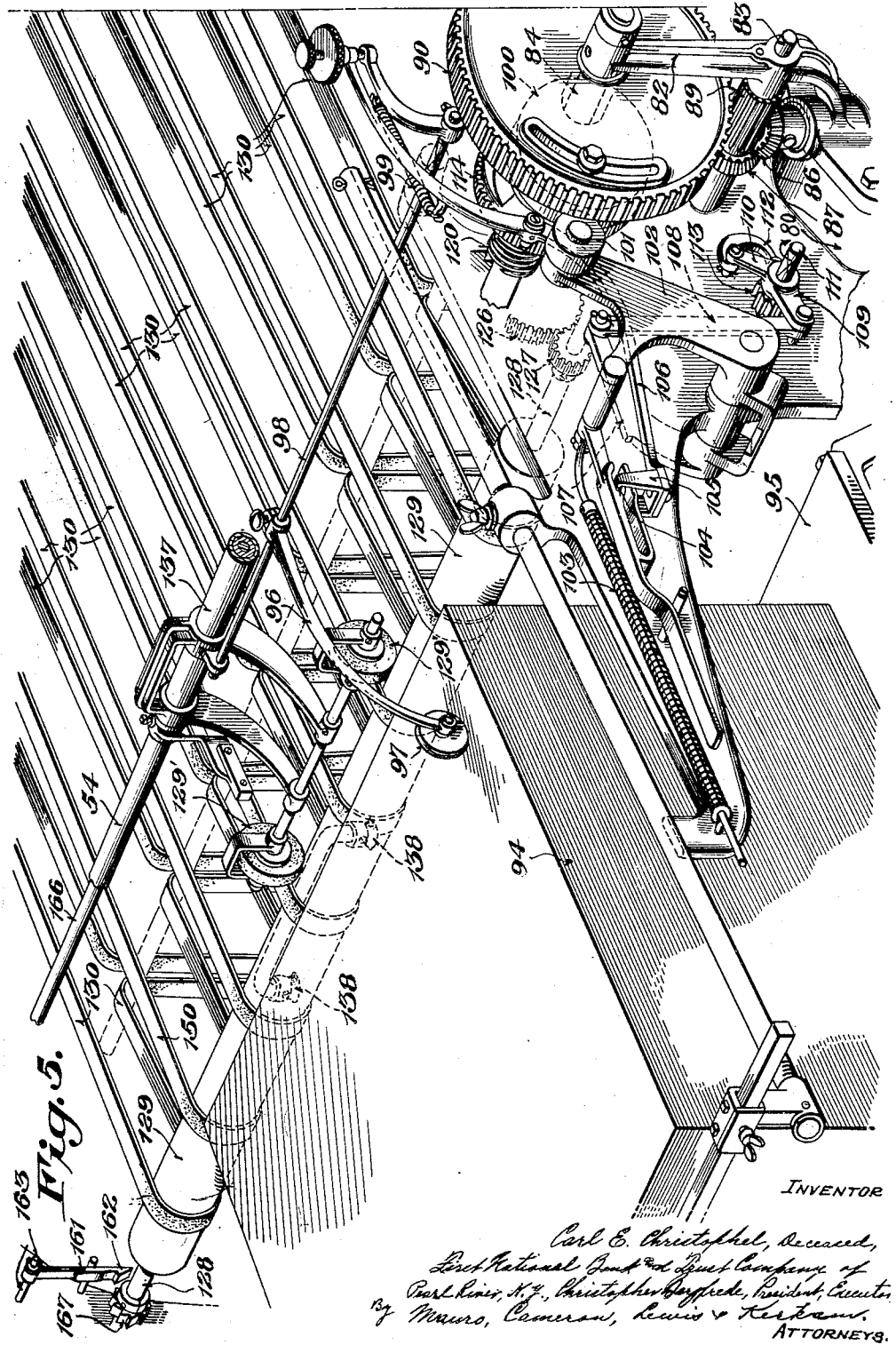

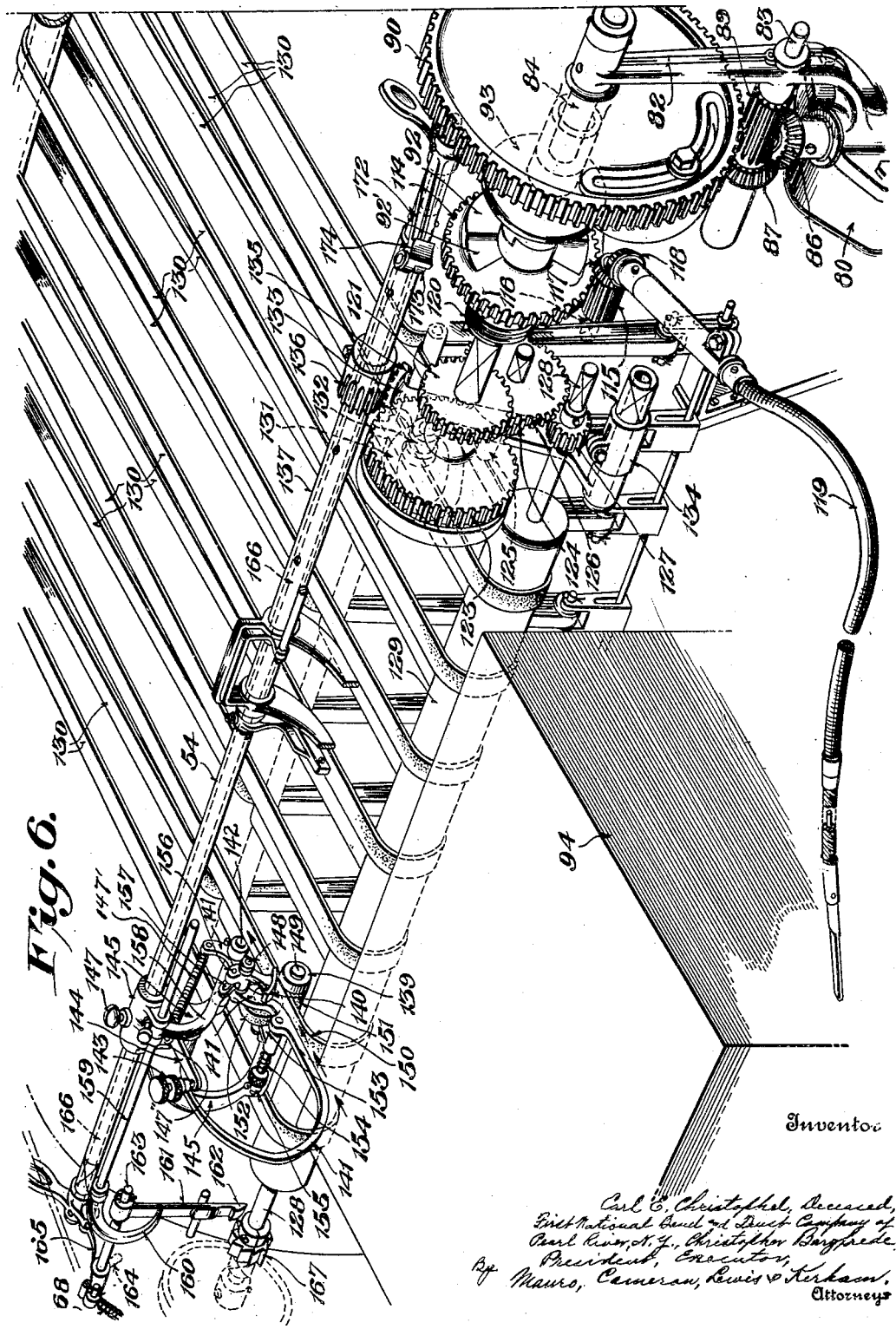

1,784,336

UNITED STATES PATENT OFFICE

CARL E. CHRISTOPHEL, DECEASED, LATE OF PEARL RIVER, NEW YORK, BY THE FIRST NATIONAL BANK AND TRUST COMPANY OF PEARL RIVER, NEW YORK, EXECUTOR; SAID CHRISTOPHEL ASSIGNOR TO DEXTER FOLDER COMPANY, OF NEW YORK, N. Y., A CORPORATION OF NEW YORK

SHEET-FEEDING DEVICE

Original application filed August 14, 1924, Serial No. 732,046, and in Great Britain August 10, 1925. Divided and this application filed January 3, 1927, Serial No. 158,771. Renewed September 27, 1929.

The present invention is an improvement in sheet calipering devices particularly adapted for use in association with feeders for printing presses, but adapted for use in any association where such a device is desirable.

The principal object of the invention is to provide a simplified and efficient calipering device. Heretofore, the calipering mechanisms used have been cam-operated and calipered either on the front or rear edge of the sheet, or sometimes both. These devices were objectionable because of the necessity for adjustment of the cam, because of the limited area of engagement of the calipering members with the sheet, and because of the limited time the members were in calipering position during one cycle of the machine. The present object has been obtained by providing a calipering device that operates throughout the length of the sheet being fed, and by eliminating the cam operation and the consequent necessity for adjustment of the cam. The control is instantaneous, and the absence of the cam obviates the time element. The connections to the clutch are immediately set upon the passing of more than a predetermined thickness at any time during the operation of the machine, and if the calipering element engages any foreign substances thicker than the predetermined thickness for which the calipering device was set. When it is considered that sheets as large as 53" by 74" have heretofore been calipered only over an area of about 6 inches, the advantages of the present calipering mechanism will be manifest.

The invention will be better understood by reference to the accompanying drawings illustrating one embodiment of the inventive idea, and wherein—

Fig. 1 is a side view of a printing press of the flat-bed variety with which is associated a feeder equipped with a calipering device embodying the present invention;

Fig. 2 is a detail, showing the drive from the intermediate press gear to the power distributing point at the pivot about which the pile feeder swings;

Figs. 3 and 4 are details of the clutch shown in dotted lines in Fig. 2;

Fig. 5 is a perspective detail view illustrating portions of a pile elevating mechanism, control therefor, and means for forwarding the sheets; and Fig. 6 is a detail view of the calipering mechanism and the feeder driving mechanism controlled thereby.

Referring to the drawings, wherein like reference characters designate like parts throughout the several views, it is pointed out that the present application is a division of my co-pending application Serial No. 732,046, filed August 14, 1924, and that the invention is shown, for purposes of illustration, in association with a pile feeder for a printing press of the well known flat-bed type. The mechanism is, however, adapted for various other uses and purposes. In the particular embodiment illustrated in the drawings, the pile feeder is mounted on a frame which is pivoted to one of the side frames of the printing press. This pivot is preferably in the form of a vertical stationary shaft 50, and the frame of the feeder comprises a plurality of transverse members 51, 52, 53 and 54, and vertical members one of which is indicated at 55 and which latter are carried by the member 51 and connected to the member 53. The lowest transverse member 51 has a bracket 56 connected thereto in which is mounted a roller 57 that rides on a track 58 projecting from the rear frame of the press. The feeder is thus swung about the stationary vertical shaft 50 with little effort from its position in association with the press to a position as remote from the same as desired, so that easy access is had to the rear of the press for placing the forms on the bed of the press or for making corrections and alterations to the form. The feeder frame is so constructed and arranged that it will stand at any desired place along the track to which it may be moved, and means such as disclosed in my copending application Serial No. 732,046 above referred to, may be provided for locking the feeder in association with the press when sheets are to be automatically fed from the pile to the impression cylinder.

The various parts of the pile feeding mechanism, a sheet separating mechanism, and a sheet forwarder, hereinafter referred to, are preferably driven from the press or other device to be fed, by an intermediate gear 59 which is driven from any suitable source of power 60 through a belt 61, a pulley 62 mounted on shaft 63, and a pinion 64 carried on the shaft 63 and meshing with and driving said intermediate gear 59. This intermediate gear 59 meshes with and drives the cylinder gear 65 that is mounted on a shaft 66 on which the impression cylinder 67 is carried.

The drive of the pile feeder is effected through a gear 68 that meshes with the intermediate gear 59. Gear 68 has compounded therewith a bevel gear 69 that meshes with a bevel gear 70 mounted on one end of a shaft 71 provided with two universal connections 72 and 73. The other end of shaft 71 is provided with a bevel gear 74 that meshes with a bevel gear 75 mounted on the lower end of a vertical shaft 76 which projects through a gear casing 77 that is pinned to shaft 50 by a pin 78. This gear casing may be provided with a suitable cover plate (not shown) and has an extended portion 79 that projects into a bracket 80 which normally rests on a shoulder 81 on said casing. The bracket 80 is secured to the feeder frame, and bolted to said bracket is a bracket 82 in which a short transverse shaft 83 and a cam shaft 84 have bearings.

The bevel gear 75 is fixed on the lower end of the shaft 76, as by a pin 85, and the upper end of said shaft 76 carries a miter gear 86 that meshes with a miter gear 87 mounted on the short transverse shaft 83. This shaft 83 carries an elongated pinion 89 which meshes with a large gear 90 mounted on the cam shaft 84 of the feeder. Said shaft 84 has also mounted thereon a two-part clutch, one part 92 being keyed on the shaft 84 and the other part 93 being loose thereon, the gear 90 being compounded with the part 93. The clutch is adapted to be opened by the operation of the calipering mechanism hereinafter described, or manually, to disconnect the driving mechanism of the feeder. The pile of sheets 94 is carried on a sheet support 95 which is automatically elevated so that the uppermost sheet of the pile is always presented to the separating mechanism in the desired manner and at the desired place. The pile may be elevated automatically and may be elevated manually. A means whereby automatic elevation of the pile is effected and controlled includes a governor arm 96, on the free end of which is mounted a roller 97 that engages the topmost sheet of the pile. The arm 96 is mounted on a rock-shaft 98 tending to move in a counterclockwise direction (Fig. 5) under the action of a spring 99.

During the normal operation of the feeder, a cam 100 on the gear 90 bears against a roller 101 on a pivotally mounted arm 102 sufficiently to counteract the pressure of a spring 103 and thus relieve the engagement of a catch 104 with a hook 105 on a pivotally mounted arm 106 controlled by the rock-shaft 98 and spring 99. It will thus appear that, if the roller 97 is lowered by the spring 99, as when a sufficient number of sheets have been fed off the top of the pile 94, the hook 105 could disengage itself from the catch 104, in which event the spring 103 would force the arm 102 and the roller 101 rearwardly so that the latter would follow the cam 100. Further, in this event, an arm 107 formed integrally with the arm 102 would swing downwardly, lowering a link 108, swinging a bell crank 109—110 on a shaft 111, and raising a pawl 112 the distance of one tooth of a ratchet 113 fixed on shaft 111, the connections from which to the pile support may be such as shown in my copending application Serial No. 158,770, filed January 3, 1927. Thereafter, as the arm 102 was forced to the left (as shown in Fig. 5) by the cam 100, the shaft 111 would be rotated in a clockwise direction the distance of one tooth of the ratchet 113, thus elevating the pile support 95 a corresponding distance through the medium of the connections between said shaft 111 and the support 95. As this elevation of the pile support is effected, the latch 104 would again be automatically engaged with the hook 105.

The sheet separating mechanism, indicated broadly at 122 (Fig. 1), may be of any suitable construction such as shown, for example, in Patent No. 1,475,621, dated November 27, 1923, the drive for said sheet separating mechanism normally being effected through the clutch 92—93 by means of gear teeth 114 provided on the periphery of clutch part 92, which gear teeth mesh with an elongated pinion 115 mounted on a short stub shaft 116, with which pinion there is compounded a bevel gear 117 that meshes with a bevel gear 118 carried by one end of a Bowden wire 119. The other end of this flexible shaft is connected with the sheet separating mechanism as disclosed in my copending application Sr. No. 732,046.

The clutch member 92 is spring-pressed toward the right by a spring 120 that tends normally to hold it in clutched relation with its companion part 93. This spring encircles the cam shaft 84. Adjacent said spring and carried by said shaft 84 is a gear 121 (Fig. 6). This gear drives the mechanism for operating the valves that control the distribution of air to the sheet separating mechanism 122 (Fig. 1) and to a sheet forwarder such as disclosed in my copending application Serial No. 732,046. Adjacent gear 121 is a gear 123 that meshes with a pinion 124 carried by a stub shaft 125, which shaft also carries a gear 126 that meshes with a pinion 127 carried by a shaft 128. This shaft carries the feed roller 129 around which pass the tapes 130 of a conveyor for carrying the sheets from the feeder to the press.

Compounded with gear 123 is an internal cam 131 in which engages a roller 132 carried by an arm 133 pivoted on a hollow bushing 134 carried by the frame of the machine. This arm is provided at its free end with a toothed section 135 that meshes with a gear 136 mounted on a tube 137 through which motion is transmitted to the sheet-forwarding device which includes the sucker mouths 138, 138 (Fig. 5). After the sheet is separated from the pile 94 by the sucker 138′ (Fig. 1) of the sheet separating mechanism, said sheet is seized along its forward edge by the sucker mouths 138, 138 which move the sheet from the pile to the feed roller 129 and rollers 129′, 129′ which rest on and are driven by the feed roller 129.

The successive sheets as they pass between the feed roller 129 and the rollers 129′, 129′, also pass between the two elements 139 and 140 of a calipering mechanism positioned in the line of feed of the sheet. If only a single sheet is fed, the device will not operate. If more than one sheet is fed, or if more than one thickness is presented to the calipering elements, the calipering mechanism will operate to interrupt the various feeding operations.

The calipering member 139 is preferably a roller over which the sheet passes and the calipering member 140 is preferably a pivoted segment under which the sheet passes, and means are provided for adjusting these elements toward and from one another. This adjustment is secured by means of a lever 141 pivoted at 142 to the caliper housing, said lever being substantially U-shaped and carrying in one end an adjusting screw 143 that rests on the top of a fixed stationary plate 144 secured to the housing 145 which latter is adjustable along the transverse member 54 which preferably consists of a tube fixedly mounted in the side frames of the feeder. The housing 145 is fixed in any desired position of adjustment on the tube 54 by means of the set-screw 147. The adjusting screw 143 is maintained in engagement with the plate 144, by a spring 147′ which has its opposite extremities connected with the forward end of lever 141 and a projection 147″ of the housing 145, respectively. The segment 140 is pivoted to the lever 141 at 148, and adjustment of the latter will effect the movement of the upper calipering member or pivoted segment 140 toward or away from the lower calipering member or roller 139.

The roller 139 is mounted on a shaft 149 carried by a part of the housing 145. This roller is rotated by one of the conveyor tapes, the tape for rotating the roller being indicated at 150. To effect rotation of the roller 139, a rubber coating 151 is placed over part of the same and is engaged by said conveyor tape 150. The tape 150 is pressed into engagement with said rubber coating 151 by a roller 152 that is mounted on an arm 153 carried by the lever 141, the pressure of said roller 152 on the conveyor tape 150 being adjusted by means of a spring 154, the spring adjustment being modified by an adjusting nut 155.

When a sheet passes between the roller 139 and the sector 140 during the normal operation of the machine, and when only one sheet at a time is being fed, the sector will remain substantially stationary. If, however, more than a single thickness is fed between the roller and the sector, the sector will move in the direction of the sheet-feed, thus moving the upper end of said sector. This upper end carries a pin 156 that engages in a slot 157 in the free end of a lever 158, the other end of which is secured to a transverse rod 159. The movement of this lever will cause the transverse rod to be swung in a clockwise direction (Fig. 6). A detent 160 carried by this rod will accordingly be swung away from a weighted pendant 161 provided with a tooth 162, which weighted pendant is pivoted on a pin 163 which projects through a slot 164 in the side frame of the feeder and which pin is carried by one arm 165 of bell-crank lever which is pinned to a clutch throw-out shaft 166. The pendant 161 is so weighted that, when the detent 160 is swung away from the same, a tooth on the pendant 161 will be moved into engagement with one of the teeth on a ratchet wheel 167 mounted on the feed roller shaft 128.

The bell-crank lever 165 which is fixed on the clutch throw-out shaft 166, is provided with a snap-action spring 168, a pin 169 (Fig. 1) being pivoted to one end of the lever and passing through an eye-bolt 170 secured to the side frame of the feeder. The spring 168 which encircles the pin 169 reacts against one arm of the bell-crank 165 and the eye-bolt 170. The eye-bolt 170 is so positioned with respect to the point at which the pin 169 is connected to the bell-crank lever 165 as to securely hold the same against a stud 171 fixed to the side of the feeder frame. This position of the parts corresponds to the normal operation of the machine when the caliper is not operated.

When the caliper is operated and the rotation of the feed roller shaft 108 causes the weighted detent 161 to be depressed, the bell-crank 165 will rock the shaft 166 and hold it fixedly in that position until the parts are manually returned to their upper position. It will be noted that the clutch throw-out shaft 166 extends completely across the machine, said shaft projecting through tubes 137 and 54. On the shaft 166, preferably at the end remote from the bell crank 165, is an arm 172, in the free end of which is mounted a roller 173 which engages between the two parts 92 and 93 of the clutch member. The part 92 of the clutch member is provided with a cam surface 92' which, as the clutch rotates, will engage said roller 173, and said part of the clutch will accordingly be forced out of engagement with the other part 93 of the clutch which is mounted on the driving end of the cam shaft. A shoe 174 engages the face 93' (Fig. 4) of the clutch member 93. This facilitates the separation of the two parts of the clutch, and holds the clutch part 93 in place during this operation.

It will therefore be appreciated that when the shaft 159 is rocked by the movement of the sector in the direction that the sheet is fed, the detent 160 will be swung away from the weighted pendant 161 so that the latter will engage the ratchet 167 and be depressed by the rotation of said ratchet, thus, through the bell-crank 165, rocking the clutch throw-out shaft 166 and depressing the arm 172 so that the roller 173 will engage the cam surface 92' on the clutch member 92 and separate the two parts of the clutch. Inasmuch as all of the operations at the feeding mechanism are controlled by the driven member 92 of the clutch, it will appear that, when the driven clutch member 92 has been moved out of engagement with the driving clutch member 93 as above described, the drive for the feeder mechanism will be disconnected. It will be noted that the calipering device has no timed element, and that, therefore, the parts will be immediately set upon the action of the calipering member. The operation of the calipering device, entirely interrupts the feeding operation of the feeder so that no sheets are fed to the conveyor 130, 130 until the extra sheet or sheets fed to the calipering mechanism have been removed. The parts of the calipering mechanism are then returned to their inoperative position and the normal operation of the machine resumed.

While one expression of the inventive idea has been described and illustrated herein with more or less particularity, it is to be expressly understood that this invention is not limited thereto, and that the invention may be embodied in a variety of mechanical expressions within the scope of the appended claims.

What is claimed is:—

1. In a calipering mechanism for sheet feeding devices, a clutch, a clutch throw-out shaft, means carried thereby for operating said clutch, calipering mechanism for the sheets being fed, a pendant provided with a tooth, a driven shaft provided with a ratchet, connections between said pendant and the throw-out shaft, and means controlled by said calipering mechanism permitting said ratchet to engage said tooth to operate said throw-out shaft.

2. In a calipering mechanism for sheet feeding devices, a hollow stay shaft, a calipering device adjustable as a unit along said shaft, a clutch throw-out rod passing through said stay shaft, a clutch, and means carried by said rod for operating said clutch.

3. In a calipering mechanism for sheet feeding devices, a clutch, a throw-out shaft, means carried on one end thereof for actuating said clutch, a lever mounted on the other end thereof, a calipering element, a pendant controlled thereby, a driven shaft, means carried thereby adapted to engage said pendant to move the same, and connections between said pendant and said lever.

4. In a calipering mechanism for sheet feeding devices, a clutch, a throw-out shaft, means carried on one end thereof for actuating said clutch, a lever mounted on the other end thereof, a calipering element, a pendant controlled thereby, a driven shaft, means carried thereby and adapted to engage said pendant to move the same, connections between said pendant and said lever, and a snap-action spring associated with said lever.

5. In a calipering mechanism for sheet feeding devices, a driven shaft and a pendant provided with interengaging means, a detent normally holding said pendant out of engagement with said driven shaft, a calipering element controlling said detent, a clutch, a clutch controlling device and connections between said pendant and said clutch controlling device.

6. In a calipering mechanism for sheet feeding devices, a driven shaft and a pendant provided with interengaging means, a detent normally holding said pendent out of engagement with said driven shaft, a calipering element controlling said detent, a bell-crank lever connected to said detent, a throw-out device connected to said lever, and a clutch controlled by said throw-out device.

7. In a calipering mechanism for sheet feeding devices, a tape conveyor, a calipering roller frictionally driven thereby, a calipering member cooperating with said calipering roller, a detent adapted to be actuated by the movement of said calipering member, a pendant controlled by said detent, a feed roller, means carried thereby for actuating said pendant, a clutch controlling device, and connections between said pendant and said clutch controlling device.

8. In a calipering mechanism for sheet feeding devices, a clutch, a throw-out device therefor, a pendant connected with the throw-out device, a driven shaft provided with means for engaging said pendant to move the latter and operate said throw-out device, a detent normally holding said pendant away from said means, and a calipering mechanism controlling said detent.

9. In a calipering mechanism for sheet feeding devices, a clutch, means for disconnecting said clutch, a pendant connected with said means, a driving shaft provided with means for engaging said pendant, a detent normally holding said pendant away from said last named means, and a calipering mechanism controlling said detent.

10. In combination, sheet feeding means, a calipering device arranged in the path of the sheet and adapted to engage the sheet throughout its length, a clutch controlling device, and connections between said calipering device and the clutch controlling device including a pendant, a driven shaft provided with means for engaging said pendant, and a detent normally holding said pendant out of engagement with said means and controlled by said calipering device.

11. In combination, sheet feeding means, a calipering device arranged in the path of the sheet, a clutch controlling device, and connections between said calipering device and the clutch controlling device including a pendant, a driven shaft provided with means for engaging said pendant, and means normally holding said pendant out of engagement with said first named means and controlled by said calipering device.

12. In combination, sheet feeding means, a calipering device arranged in the path of the sheets, a clutch, and clutch controlling mechanism including a driven shaft provided with a ratchet, a member adapted to be engaged with said ratchet, and means for normally holding said member out of engagement with said ratchet and controlled by said calipering device.

13. In combination, sheet feeding means, a calipering device arranged in the path of the sheets being fed, a clutch, and clutch controlling mechanism including a movable element provided with an engaging surface, a member movable by its own weight into engagement with said surface, and means for normally holding said member out of operative engagement with said surface and controlled by said calipering device.

14. The combination with sheet feeding means including a feed roller, of a caliper bracket or housing supported adjacent said feed roller, a caliper roller mounted on said bracket or housing, an endless sheet conveying element passing over the feed roller and the caliper roller and driving the latter, an adjusting lever carried on the bracket or housing, a normally stationary calipering member pivoted on said lever and adapted to be operated by said caliper roller when more than one sheet at a time is fed between the same and said calipering member, a roller carried by the adjusting lever and engaging the endless sheet conveying element to positively feed the sheets singly in succession between the caliper roller and the calipering member, a clutch controlling the operation of the sheet feeding device, and a member for operating said clutch mechanically connected with said calipering member and controlled thereby.

In testimony whereof said executor, by its president, has signed this specification.

FIRST NATIONAL BANK AND TRUST
   COMPANY OF PEARL RIVER, NEW
   YORK,
By CHRISTOPHER BARGFREDE,
                    President,
Executor of the Estate of Carl E. Christophel, Deceased.